United States Patent
Côté et al.

(10) Patent No.: US 9,824,490 B1
(45) Date of Patent: Nov. 21, 2017

(54) AUGMENTATION OF A DYNAMIC TERRAIN SURFACE

(71) Applicant: Bentley Systems, Incorporated, Exton, PA (US)

(72) Inventors: Stéphane Côté, Lac Beauport (CA); Ian Létourneau, Quebec (CA); Jade Marcoux-Ouellet, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 85 days.

(21) Appl. No.: 14/733,660

(22) Filed: Jun. 8, 2015

(51) Int. Cl.
| | | |
|---|---|---|
| *G06T 17/05* | (2011.01) | |
| *E02F 9/24* | (2006.01) | |
| *G06T 19/00* | (2011.01) | |
| *G06T 17/10* | (2006.01) | |

(52) U.S. Cl.
CPC .............. *G06T 17/05* (2013.01); *E02F 9/245* (2013.01); *G06T 17/10* (2013.01); *G06T 19/006* (2013.01)

(58) Field of Classification Search
CPC ....... G06T 17/05; G06T 19/00; G06T 19/006; G06T 2219/004; E02F 9/264; E02F 9/261
See application file for complete search history.

(56) References Cited

U.S. PATENT DOCUMENTS

| | | |
|---|---|---|
| 8,249,306 B2 | 8/2012 | Nielsen et al. |
| 8,384,742 B2 | 2/2013 | Nielsen et al. |
| 8,914,199 B2 | 12/2014 | Nomura et al. |
| 9,465,129 B1 * | 10/2016 | Olsson ............... G01V 3/15 |
| 2014/0184643 A1 * | 7/2014 | Friend ................ G09G 3/003 345/633 |
| 2014/0200863 A1 * | 7/2014 | Kamat ................ G01C 15/00 703/1 |

(Continued)

OTHER PUBLICATIONS

Kreylos, "Augmented Reality Sandbox", URL:<http://www.iday.ucdavis.ed/~okreylos/ResDev/SARndbox/MainPage.html>, Jun. 4, 2015, 3 pages.*

(Continued)

*Primary Examiner* — Gregory J Tryder
*Assistant Examiner* — Diane Wills
(74) *Attorney, Agent, or Firm* — Cesari and McKenna, LLP; James A. Blanchette

(57) ABSTRACT

In one embodiment, an augmented view is generated that accounts for dynamically changing terrain surface at a site. A sensor captures live georeferenced terrain surface topography for the site. A camera captures an image of the site. Further, a tracking system determines a georeferenced camera pose of the camera. An augmented reality application aligns a georeferenced three-dimensional (3-D) model for the site with the live georeferenced terrain surface topography. Then, using at least the captured image, the georeferenced camera pose, the georeferenced 3-D model and live georeferenced terrain surface topography, the augmented reality application creates an augmented view of the site that shows graphical representations of subsurface features. At least a portion of the graphical representations are dynamically conformed to the contours of the terrain surface in the image based on the live georeferenced terrain surface topography. The graphical representations may include virtual excavation and/or virtual paint markings.

20 Claims, 9 Drawing Sheets

(56) References Cited

U.S. PATENT DOCUMENTS

2014/0253550 A1* 9/2014 Bachrach ............... G06T 19/00
                                                    345/420
2014/0285375 A1* 9/2014 Crain ................... G01S 13/885
                                                    342/25 A

OTHER PUBLICATIONS

Pfeifle, NPL "What Is 3D Data Capture'?", SPAR Point Group Diversified Business Communications, 2012, URL:<http://www.ucl.ac.uk/slade/know/admin/wp-content/uploads/What-is-3D-Data-Capture1.pdf>, p. 1-17.*

Avery, Benjamin et al., "Improving Spatial Perception for Augmented Reality X-Ray Vision", IEEE Virtual Reality, Mar. 14-18, 2009, Lafayette, LA, 4 pages.

Behzadan, Amir H., ARVISCOPE: Georeferenced Visualization of Dynamic Construction Processes in Three-Dimensional Outdoor Augmented Reality, published by University of Michigan, May 2008, 282 pages.

Cote, Stephane et al., U.S. Appl. No. 13/945,552 for Dynamic and Selective Model Clipping for Enhanced Augmented Hypermodel Visualization, filed Jul. 18, 2013, 33 pages.

Cote, Stephane et al., U.S. Appl. No. 13/847,909 for Visualization of 3-D GRP Data in Augmented Reality, filed Mar. 20, 2013, 26 pages.

Mine, Mark et al., Projection-Based Augmented Reality in Disney Theme Parks, published by the IEEE Computer Society, Jul. 2012, pp. 33-40.

Roberts, Dr. Gethin W., The Use of Augmented Reality, GPS and INS for Subsurface Data Visualisation, TS5. 13 Integration of Techniques, FIG XXII International COngress, Washington, D.C. USA, Apr. 19-26, 2002, 12 pages.

Schall, Gerhard et al., Handheld Augmented Reality for Underground Infrastructure Visualization, Personal and Ubiquitous Computing, Special Issue on Mobile Spatial Interaction, Springer, 2008.

Schall, Gerhard et al., VIDENTE—3D Visualization of Underground Infrastructure using Handheld Augmented Reality, Integrating GIS and Water 1.4E, 2010,17 pages.

Schall, Gerhard et al., "Urban 3D Models: What's Underneath? Handheld Augmented Reality for Subsurface Infrastructure Visualization", Proc. of Ubicomp '07, Sep. 2007, 4 pages.

Su, Xing et al., Uncertainty-aware visualization and proximity monitoring in urban excavation: a geospatial augmented reality approach, Visualization in Engineering, 1:2. Jun. 13, 2013, 1:2, 13 pages.

Talmaki, Sanat A. et al., "Geospatial Databases and Augmented Reality Visualization for Improving Safety in Urban Excavation Operations", retrieved on Mar. 20, 2013, 10 pages.

Côoté S., Augmented Reality: X-ray Vision for Utility Professionals. *Utility Horizons*, Sep. 2012, pp. 27-32.

Jones, Brett, "The Most Awesome Sandboxes Ever—Via Projection Mapping", retrieved from http://projection-mapping.org/the-most-awesome-sandbox-ever/, Jun. 8, 2015, 9 pages.

Reitmayr, Gerhard, et al., "Going Out: Robust Model-Based Tracking for Outdoor Augmented Reality," IEEE Computer Society, Proceeding ISMAR '06 Proceedings of the 5th IEEE and ACM International Symposium on Mixed and Augmented Reality, Oct. 22-25, 2006, pp. 1-10.

Wagner, Daniel,"Real-time Panoramic Mapping and Tracking on Mobile Phones," IEEE Computer Society, Proceeding VR '10 Proceedings of the 2010 IEEE Virtual Reality Conference, Mar. 20-24, 2010, pp. 1-8.

* cited by examiner

AUGMENTATION OF A DYNAMIC TERRAIN SURFACE

BACKGROUND

Technical Field

The present disclosure relates to augmented reality, and more specifically, to techniques for using augmented reality with a dynamically changing terrain surface.

Background Information

Excavation is typically a high-risk operation. During excavation, subsurface features (i.e., water pipes, gas pipes, sewer pipes, electrical lines or other below-grade utilities or obstructions) may be struck by excavators causing potentially serious injuries and damage. Any repairs necessitated by the damage may lengthen the disruption caused the by the excavation. For example, if the excavation is part of a road work project and a water pipe is struck and damaged, the time needed to repair the damage may significantly lengthen any traffic disruption already caused by the project, and impose a further burden on local residents and businesses.

One of the main causes of subsurface utilities strikes is uncertainty on behalf of the excavator operator as to the location of the utilities. Currently, subsurface features are located using a combination of data records and geophysical technologies, such as group penetrating radar (GPR). Workers then go the excavation site and draw markings on the ground, typically using a colored spray paint, to indicate the presumed locations of the subsurface features. FIG. 1 is a photograph 100 of a street showing colored spray paint markings 110 drawn on the ground to indicate subsurface features, typical of the current procedure.

However, there are several shortcomings with this procedure. First, colored spray paint markings are short lived. Since the markings are painted on the ground directly where the excavation is to occur, as soon as the excavation begins the markings are generally destroyed and the information is lost. An excavator operator needs to try to remember where the markings once were as the terrain changes. If the excavation work lasts more than one day, the operator needs to try to remember this information overnight, or over even longer breaks in the work schedule. Second, colored spray paint markings do not provide sufficient depth information. While the markings may indicate a presumed depth of subsurface features, it can be difficult for even an experienced operator to visually estimate from the cab of the excavator when an excavation has reached this depth. Third, it can be difficult to accurately determine where colored spray paint markings should be placed on uneven ground. While a worker may be able to measure where markings should be placed on a flat surface, if the surface is highly uneven (for example, as is generally the case during an ongoing excavation), measuring where markings should be applied is non-trivial.

There has been research into using augmented reality techniques to assist in planning excavation work, prior to the start of any actual excavation at the site. Some of this research has involved techniques that use a virtual excavation to show subsurface utilizes during the planning stage. However, such techniques have generally relied upon an assumption that the terrain surface is static. Such techniques generally would not function properly during the course of an ongoing excavation, as the terrain is dynamically changing. They are unsuited for use by operators of excavators and other on-site workers who require aid in determining the location of subsurface features during the course of ongoing work.

Accordingly there is a need for new techniques for using augmented reality with a dynamically changing terrain surface that, for example, can aid in locating subsurface features during an ongoing excavation.

SUMMARY

In one embodiment, an augmented reality application utilizes a live georeferenced terrain surface topography to generate an augmented view that accounts for a dynamically changing terrain surface. A sensor may capture the live georeferenced terrain surface topography for a site. A camera may capture an image of the site. Further, a tracking system may determine a georeferenced camera pose of the camera. An augmented reality application may align a georeferenced three-dimensional (3-D) model for the site with the live georeferenced terrain surface topography. Then the augmented reality application may create an augmented view of the site that shows graphical representations of subsurface features, where at least a portion of the graphical representations are dynamically conformed to the contours of the terrain surface in the image based on the live georeferenced terrain surface topography. The graphical representations may include a virtual excavation and/or virtual paint markings imposed in the image.

A virtual excavation is a virtual hole in the terrain surface that provides a context for observing textured 3-D elements representing subsurface features. The virtual excavation may have side boundary surfaces and a bottom boundary surface, while being open at the top. The extent of (e.g., the upper limit of) at least the side boundary surfaces may be dynamically conformed to the contours of the terrain surface, based on the live georeferenced terrain surface topography. The virtual paint markings are textures imposed upon the terrain surface. The textures may be imposed at locations on the terrain surface that are above the locations of subsurface features. The locations where the textures appear may be dynamically conformed to the contours of the terrain surface, based on the live georeferenced terrain surface topography. A virtual excavation and virtual paint markings may be displayed singly, in combination, or as part of a larger hybrid display that also shows other types of views of the site.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings, of which.

DETAILED DESCRIPTION

Figure 1:
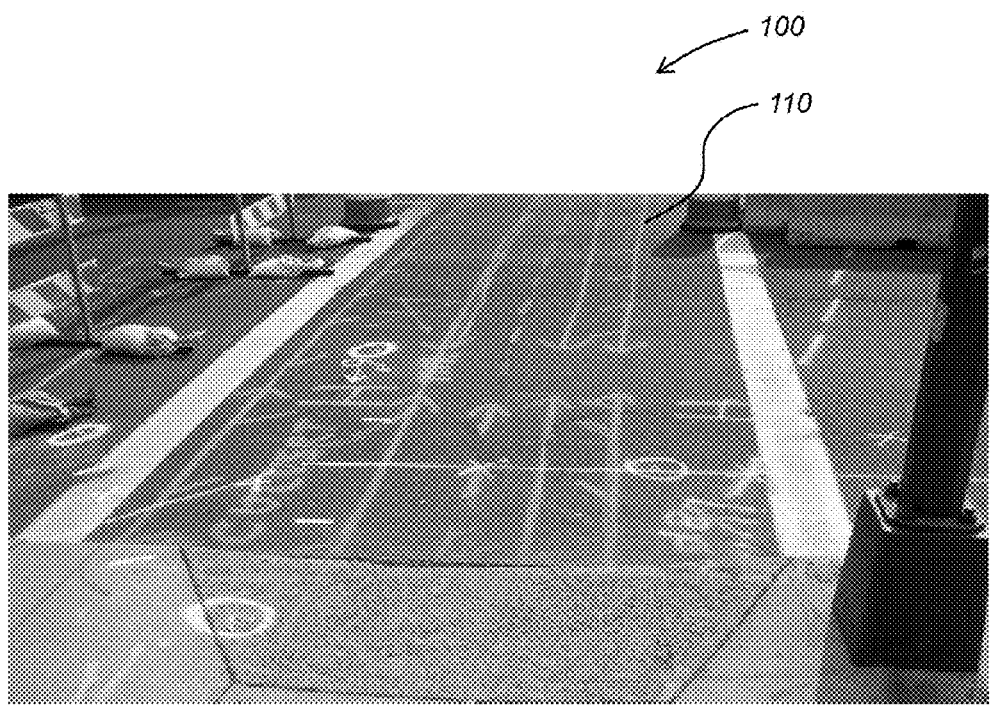
FIG. 1 is a photograph of a street showing colored spray paint markings drawn on the ground to indicate subsurface features, typical of the current procedure.
Figure 2:
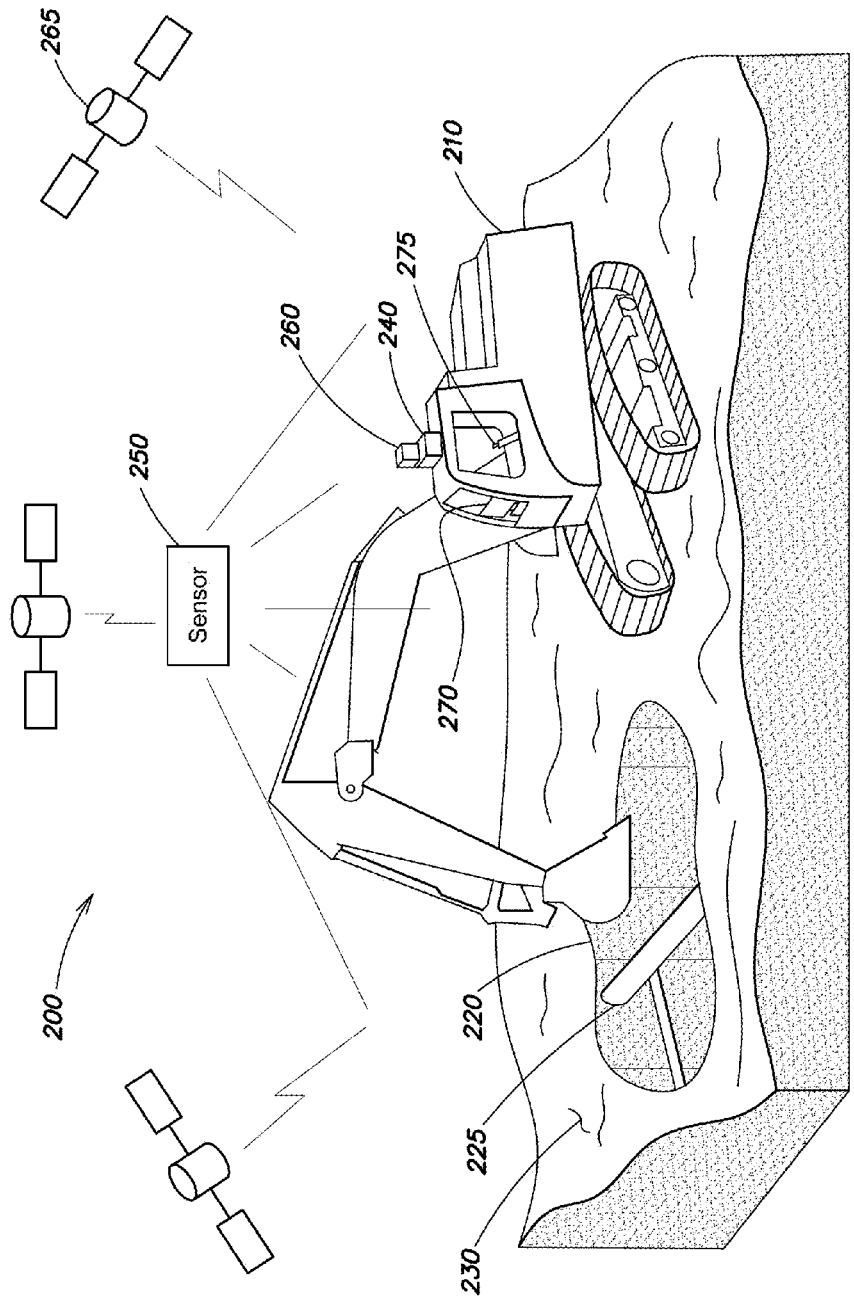
FIG. 2 is a diagram of an example system for providing augmented reality at a site with a dynamically changing terrain surface.

FIG. 2 is a diagram of an example system 200 for providing augmented reality at a site with a dynamically changing terrain surface. A terrain surface is considered to be dynamically changing if it is subject to continuous or periodic alterations over a period of time. In this example, the terrain surface is dynamically changing as a result of an ongoing excavation 220 by an excavator 210 in the terrain 230. In this example, various subsurface features, such as pipes 225, may be disposed at the site, in the path of the excavation 220 and/or proximate thereto.

The system may include a camera 240 that captures a view of the site of the excavation 220 used for augmentation. The camera 240 may be a video camera (e.g., a webcam) that captures successive images at a predetermined frame rate. In one implementation, the camera 240 is mounted to the excavator, for example, in the excavator's cab, so that it shares a similar perspective to that of the operator. Alternatively, the camera 240 may be located somewhere else, for example, on a tripod at a position proximate to the site of the excavation 220.

A sensor 250 may capture a live georeferenced terrain surface topography for the site of the excavation 220. A terrain surface topography may be considered to be "live" if it provides a substantially contemporaneous representation of the terrain surface. In one implementation, the live georeferenced terrain surface topography is initially captured as a point cloud and then converted to a polygon mesh, as explained in more detail below. The sensor 250 may be a depth-sensing camera, for example, a time-of-flight camera that resolves distance to objects in an entire scene based on the known speed of light of a light pulse emitted by the camera. Alternatively, the sensor 250 may be a laser scanning system (e.g. a Lidar system) that measures distance to objects point-by-point based on a laser beam that scans across the scene. In one implementation, the sensor 250 may be mounted to a flying drone which (under manual or automatic control) is configured to hoover above the site of the excavation 220. Alternatively, the sensor 250 may be mounted to the roof the excavator 210, or another location that has a substantially unobstructed view of the site of the excavation 220.

A tracking system 260 may collect data for determining a georeferenced pose (i.e. position and orientation) of the camera 240, and potentially of the sensor 250, the excavator 210, the bucket of the excavator, or other objects at the site. In one implementation, the tracking system 260 is based on high-accuracy global positioning system (GPS) receivers and orientation sensors. For example, a high-accuracy GPS receiver may be coupled to the camera 240 to determine its position, and an orientation sensor may be coupled to the camera 240 to determine its orientation. Alternatively, the tracking system 260 may utilize one or more robotic total station theodolite (TST) stations positioned proximate the site of the excavation. In still other alternatives, the tracking system 260 may employ multiple tracking cameras that detects markers affixed to objects at the site (for example to the excavator 210), or may employ some other form of localization system.

A display device 270 may show an augmented view of the site of the excavation 220 to the operator (and/or another worker as discussed further below). The augmented view may show both the current terrain surface and graphical representations of subsurface features. The display device 270 may also show portions of a user interface of an augmented reality application used to generate the augmented view. The user interface may allow for the selection of certain options for activating, deactivating, and changing aspects of the augmented view. The display device 270 may be a display screen (e.g., a liquid-crystal-display screen) located within the cab of the excavator 210. Alternatively, the display device may be a heads up displays (HUD) that uses a projection unit and combiner to project images upon the windshield of the excavator 210.

An input device 275 (e.g., buttons, a touch sensor, a joystick, etc.) may be provided for interacting with the augmented reality application (e.g. via its user interface). For example, a button may be disposed in the cab of the excavator for activating and deactivating display of the augmented reality view.

The camera 240, the sensor 250, the tracking system 260 and the display device 270 may communicate with one or more computing devices that execute the augmented reality application. In one implementation, the computing devices may include a remote server that is in communication with the camera 240, the sensor 250, the tracking system 260, and the display device 270 over a wide area network (WAN). Alternatively, the one or more computing devices may be locally located (e.g., a local server mounted in the cab of the excavator 210).

Figure 3:
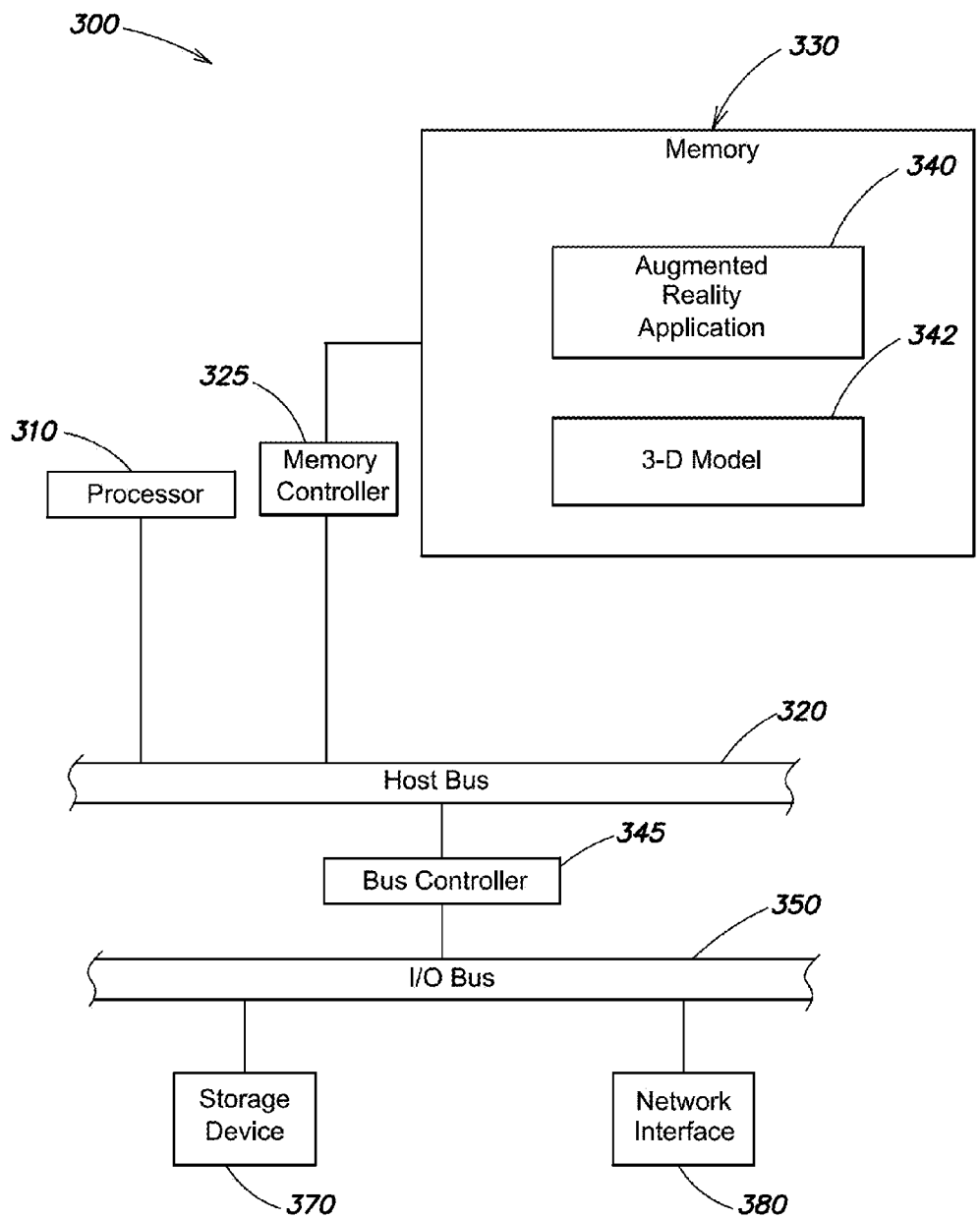
FIG. 3 is a block diagram of components of an example server that may be used with the system of FIG. 2.

FIG. 3 is a block diagram of components of an example server 300 that may be used with the system of FIG. 2. The server 300 may include at least one processor 310 coupled to a host bus 320. The processor 310 may be any of a variety of commercially available processors. A volatile memory 330, such as a Random Access Memory (RAM), may be coupled to the host bus 320 via a memory controller 325. The memory 330 may be configured to store at least a portion of computer-executable instructions and data for applications while the server 300 is operating. The applications may include the above discussed augmented reality application 340. In operation, the augmented reality application 340 may access a georeferenced 3-D model 342 of the site of the excavation. The georeferenced 3-D model 342 includes individual elements representing surface features, associated with positions in 3-D space. In one implementation, the georeferenced 3-D model 342 is created and/or maintained by a CAD environment (not shown), for example, the MicroStation® V8i environment available from Bentley Systems Inc. of Exton Pa.

The host bus 320 of the server 300 may be coupled to an input/output (I/O) bus 350 through a bus controller 345. A persistent storage device 370, such as a hard disk drive, a solid-state drive, or another type or persistent data store, may be coupled to the I/O bus 350 to persistently store instructions and data (e.g., for the augmented reality application 340 and georeferenced 3-D model 342) that are available to be loaded to the volatile memory 330 when needed. Further, a network interface 380 (e.g., a wireless interface or a wired interface) may interface with a computer network, for example, the Internet (not shown) to allow communication with the camera 240, the sensor 250, the tracking system 260, the display device 270, and the input device 275 of FIG. 2.

The augmented reality application 340 may operate to create an augmented view of the site while the terrain surface dynamically changes, e.g., as a result of ongoing excavation. Using at least the captured image from the camera 240, the georeferenced camera pose from the tracking system and the georeferenced 3-D model 342, the augmented reality application 340 may create an augmented view that shows graphical representations of subsurface features, wherein a least a portion of the graphical representations are dynamically conformed to the contours of the terrain surface based on the live georeferenced terrain surface topography from the sensor 250. The graphical representations of subsurface features may take different forms.

In a first form, the graphical representations may be textured 3-D elements within a virtual excavation imposed upon the images captured by the camera 240. The virtual excavation is a virtual hole in the terrain surface that provides a context for observing textured 3-D elements representing the subsurface features. The virtual excavation may be substantially cuboid in shape, having planar side boundary surfaces and a planar bottom boundary surface, while being open at the top. The extent of (e.g., the upper limit of) at least the side boundary surfaces may be dynamically conformed to the contours of the terrain surface, based on the live georeferenced terrain surface topography captured by the sensor 250.

In a second form, the graphical representations of subsurface features may be virtual paint markings made from textures imposed upon the terrain surface in the images captured by the camera 240. The textures may be imposed at locations on the terrain surface that are above the subsurface features. The location where the textures appear may be dynamically conformed to the contours of the terrain surface, based on the live georeferenced terrain surface topography captured by the sensor 250.

A virtual excavation and virtual paint markings may be presented singly, or in combination, depending on the implementation. Further, a virtual excavation and/or virtual paint markings may be included as part of a larger hybrid display that also includes as one or more other types of information, such as vertical sections.

Figure 4:
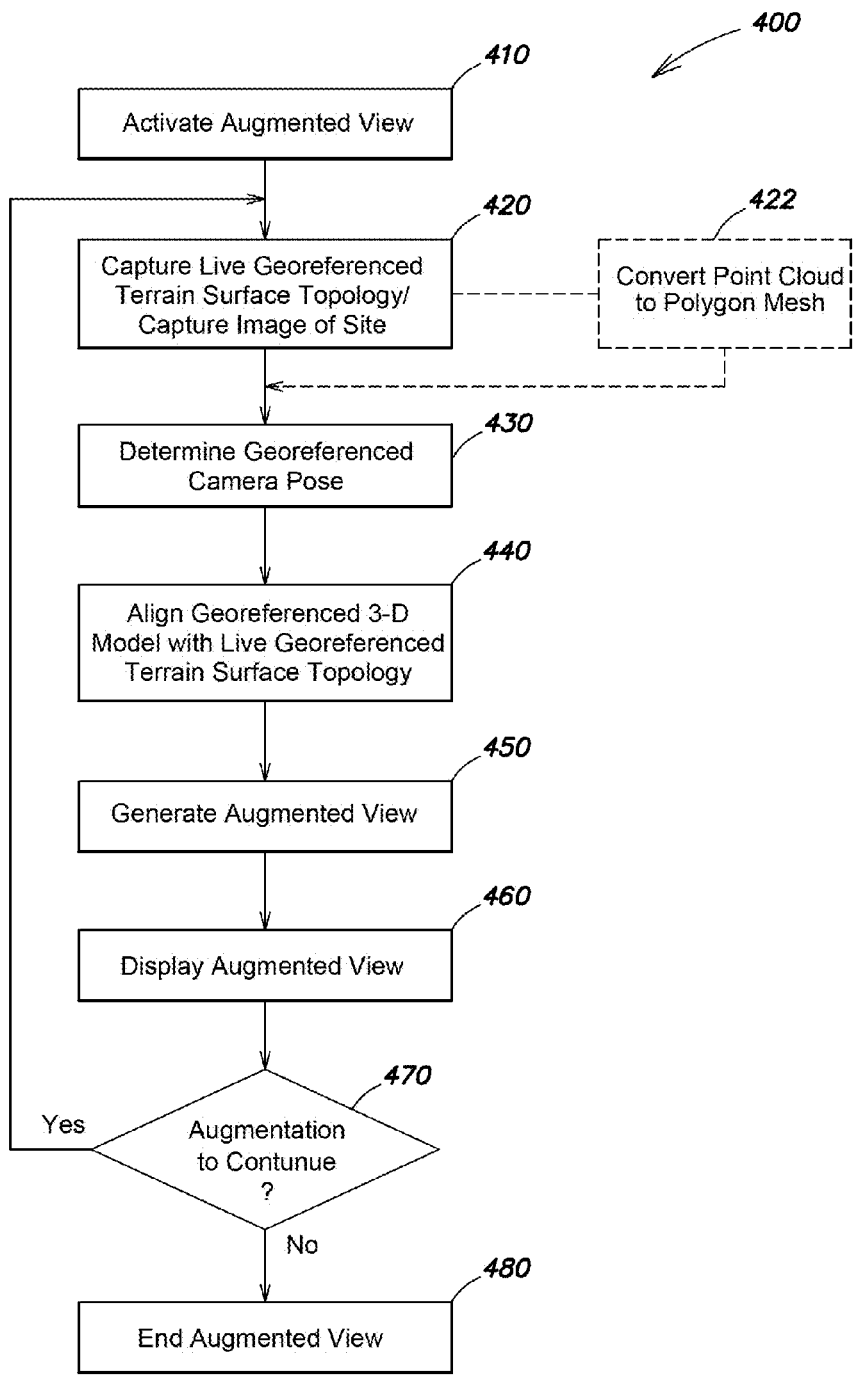
FIG. 4 is a flow diagram of a sequence of steps for creating an augmented view that includes graphical representations of subsurface features for a site having a dynamically changing terrain surface.

FIG. 4 is a flow diagram of a sequence of steps 400 for creating an augmented view that includes graphical representations of subsurface features for a site having a dynamically changing terrain surface. At step 410, input is received (e.g., via the input devices 275) that indicates an augmented view is to be activated.

At step 420, the sensor 250, under direction of the augmented reality application 340, captures a live georeferenced terrain surface topography for the site. Further the camera 240 captures an image of the site, e.g., as part of a sequence of images that form a video stream. The image and the live georeferenced terrain surface topography may be captured substantially simultaneously with respect to each other, or may be captured at different somewhat different times, due to different capture intervals. However, a substantial period of time typically should not elapse between capturing the georeferenced terrain surface topography and the image, absent special circumstances.

In implementations where the live georeferenced terrain surface topography takes the form of a point could, at optional step 422, the point cloud is converted to a polygonal mesh before further use. The conversion may be performed using a library of the augmented reality application 240 that implements a 2.5D Delaunay triangulation algorithm, or other similar algorithm. To speed conversion, the point cloud may be cropped to exclude information remote from the site. Further, in some cases, the point cloud may be filtered (e.g., with a median filter) to remove noise, down sampled, smoothed and/or simplified (e.g., with a mesh simplification algorithm).

At step 430, the tracking system 260, under the direction of the augmented reality application 340, determines a georeferenced pose (i.e. position and orientation) of the camera 240. In an example where the augmented view is intended to be displayed to the operator of an excavator 210, the camera pose may represent the excavator operator's point of view.

At step 440, the augmented reality application 340 may align the georeferenced 3-D model 342 with the live georeferenced terrain surface topography, e.g., the polygon mesh. The alignment may be conducted by an automated alignment algorithm of the augmented reality application 340. For example, the alignment algorithm may locate invariant image features, such as corners in both the georeferenced 3-D model 342 and in portions of the live georeferenced terrain surface topography that have not changed recently, and register such features. Alternatively, the automated alignment algorithm may treat the georeferenced 3-D model 342 and the live georeferenced terrain surface topography as random variables, and apply statistical techniques which attempt to maximize mutual information, for example by measuring the dependence between two probability distributions. In other implementations, the alignment may be conducted manually, for example, by a user indicating correspondence between certain features in the georeferenced 3-D model 342 and portions of the live georeferenced terrain surface topography. The manual alignment may be conducted in a user interface of the augmented reality application 340 or another application.

At step 450, the augmented reality application 340 may generate an augmented view that shows graphical representations of subsurface features, in which a least a portion of the graphical representations are dynamically conformed to the contours of the terrain surface based on the live georeferenced terrain surface topography from the sensor 250. For example, the augmented reality application 340 may augment the captured image from the camera 240 to add a virtual excavation and/or virtual paint markings. Further details of such operations may be found further below.

At step 460, the augmented view is displayed upon the display device 270. For example, the augmented view may be displayed within the cab of the excavator 210 to the operator to assist in an ongoing excavation.

At step 470, a check is performed whether augmentation is to continue, based on input entered via an input device 275. If augmentation is to continue, execution loops back to step 420. If not, execution concludes at step 480.

Figure 5:
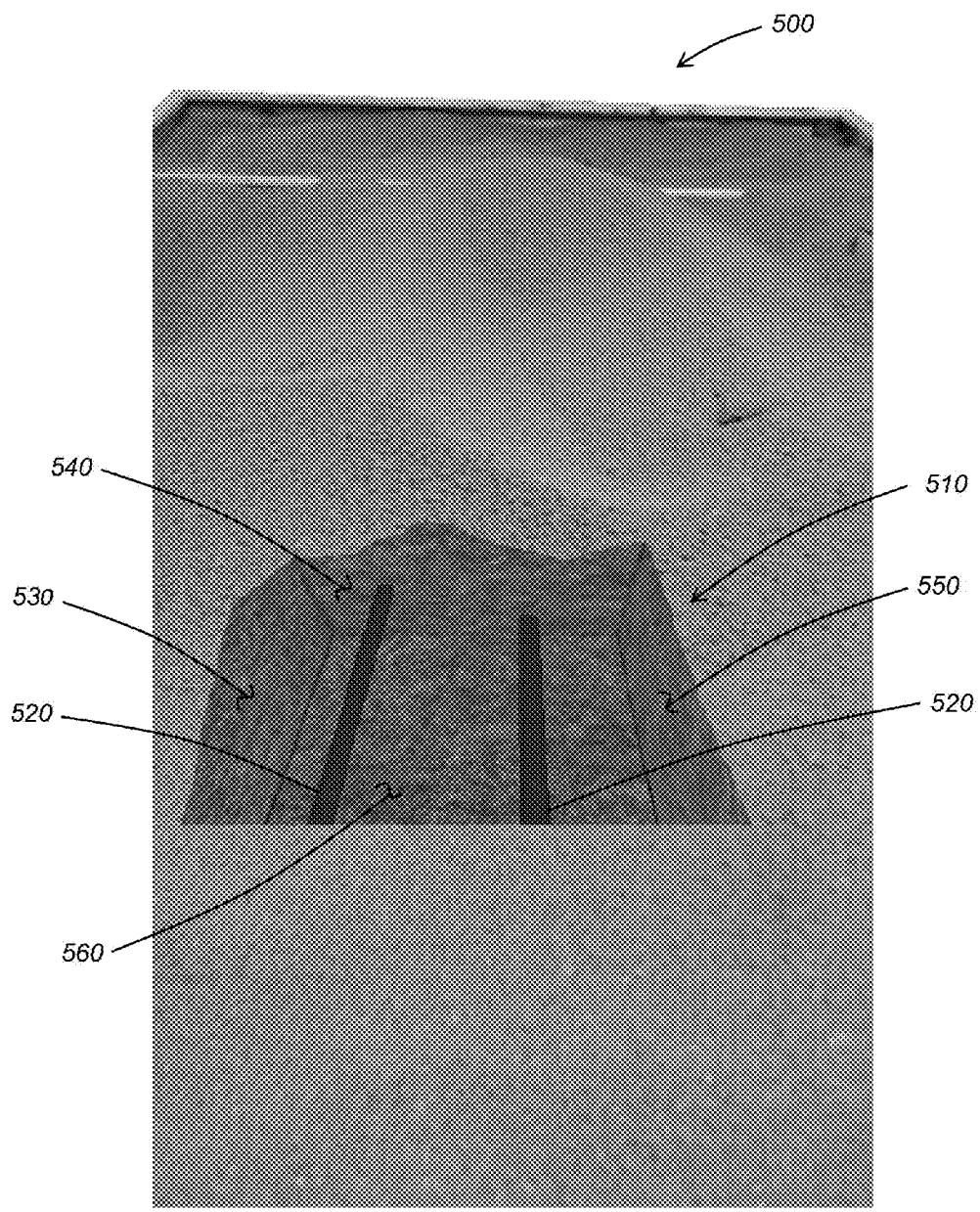
FIG. 5 is an example augmented view including a virtual excavation that may be created as part of the sequence of steps of FIG. 4.

FIG. 5 is an example augmented view 500 including a virtual excavation 510 that may be created as part of FIG. 4. In this example, the augmented view depicts sandy terrain, and the virtual excavation 510 is designed to appear to extend through the surface of the sand, to permit viewing of textured 3-D elements representing subsurface features disposed beneath the surface. In this example, the subsurface features take the form of pipes 520. The virtual excavation 510 has planar side boundary surfaces 530, 540, 550, and a planar bottom boundary surface 560.

The textures on the 3-D elements may be color coded to identify properties of the subsurface features (e.g., whether the pipes 520 are water pipes or gas pipes). In one implementation, the textured 3-D elements may appear the actual size of the subsurface features. However, generally there is some uncertainty in the positions of subsurface features due to the data records that are available and the locating technologies originally used to measure their locations. Accordingly, in other implementations, the textured 3-D elements may be larger than the actual size of the subsurface features to incorporate an uncertainty bubble. The uncertainty bubble may be a semi-transparent region around the presumed location of the subsurface feature, with the degree of transparency at a given point dependent on the probability that the feature is located at the given point (e.g., the higher the probability the more opaque).

Figure 6:
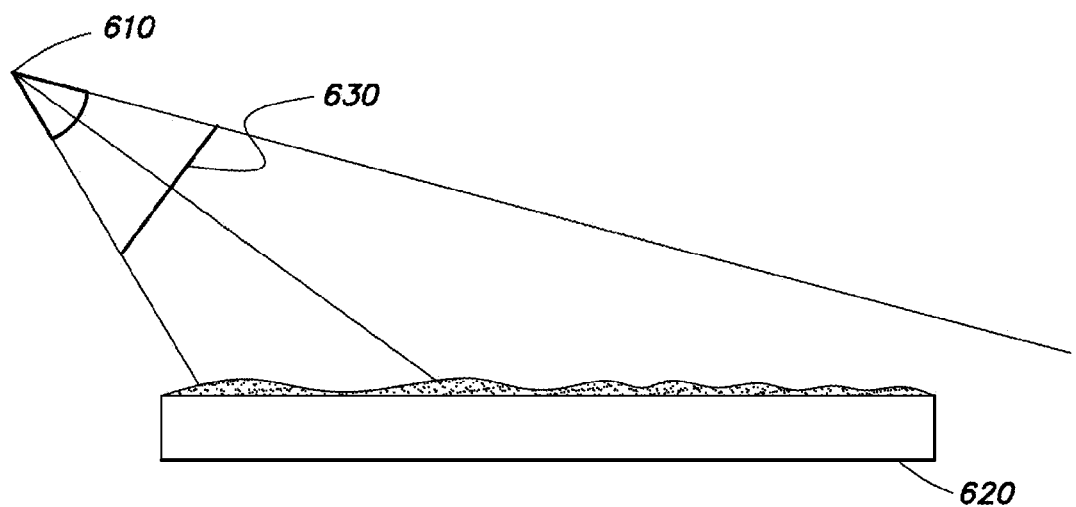
FIG. 6 is a diagram illustrating one technique that may be implanted by the augmented reality application to create the virtual excavation of FIG. 5.

FIG. 6 is a diagram illustrating one technique that may be implanted by the augmented reality application 340 to create the virtual excavation of FIG. 5. A virtual camera 610 may be positioned in model space relative to an aligned georeferenced 3-D model 620. Selected elements in the 3-D model may be rendered and textured. Boundary surface (e.g., side boundary surfaces and a bottom boundary surface) may be added around the textured 3-D elements to provide context. A plane 630 may be placed between the front of the virtual camera 610 and the rendered 3-D elements and boundary surfaces, at a selected position determined based upon the pose of the camera 240, and the camera's inherent properties. An image captured by the camera 240 is projected upon the plane. The projected image is clipped away to reveal the rendered 3-D elements and boundary surfaces. The extent of the clipping may be based on the live georeferenced terrain surface topography, such that the extent of what is shown is limited. For example, the clipping may limit the extent of side boundary surfaces to not extend above the level of the terrain. The augmented image thereby produced may then be displayed as part of step 460 of FIG. 4.

Figure 7:
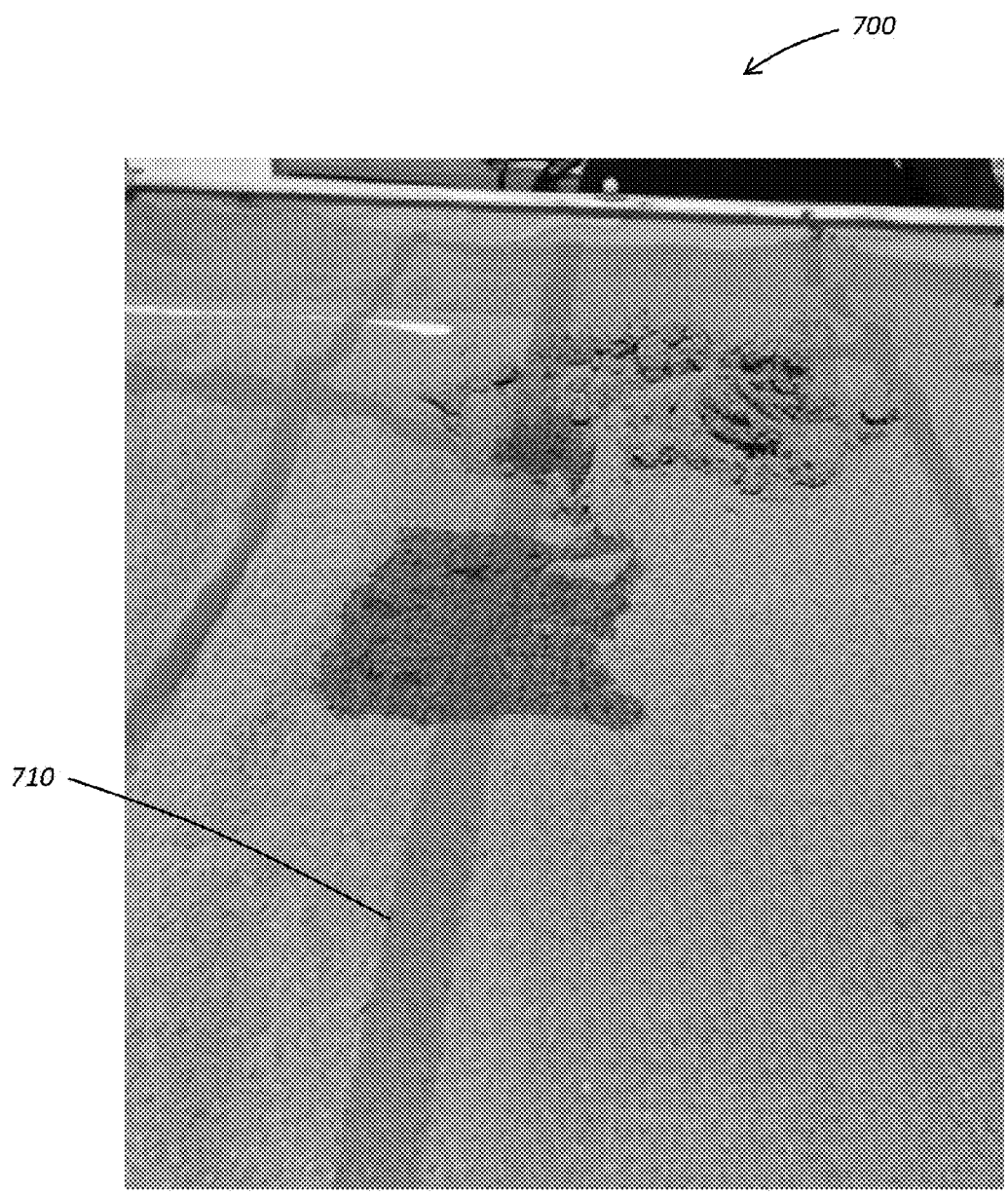
FIG. 7 is an example augmented view including virtual paint markings that may be created as part of the sequence of steps of FIG. 4.

FIG. 7 is an example augmented view 700 including virtual paint markings 710 that may be created as part of FIG. 4. In this example, the virtual paint markings represent pipes, and are imposed at locations on the terrain surface that are above the presumed locations of subsurface pipes. The locations where the textures appear may be dynamically conformed to the contours of the terrain surface as it changes, such that, unlike conventional paint markings, they are preserved through the course of an ongoing excavation where the surface is disrupted.

In one technique, the augmented reality application 340 may create the virtual paint markings of FIG. 7 using a procedure similar to that used to create a virtual excavation, as discussed above in reference to FIG. 6. Again, a virtual camera may be positioned in model space relative to the aligned georeferenced 3-D model 342. Selected elements in the 3-D model 342 may be projected onto the live georeferenced terrain surface topography it is aligned with, and textures added to create a textured surface. The same texture may be used for all elements, or different textures can be used for different types of subsurface features (e.g., a different texture for each pipe). In some implementations, a color gradient may be adjusted based on a distance between the terrain surface and the subsurface features. Similar to FIG. 6, a plane may be placed between the front of the virtual camera and the textured surface, at a selected position determined based upon the pose of the camera 240, and the camera's inherent properties. An image captured by the camera 240 is projected upon the plane. Textures from the textured surface, as viewed from the virtual camera, may be blended with the image on the plane to create semi-transparent markings on the terrain surface in the image. The augmented image thereby produced may then be displayed as part of step 460 of FIG. 4.

Figure 8:
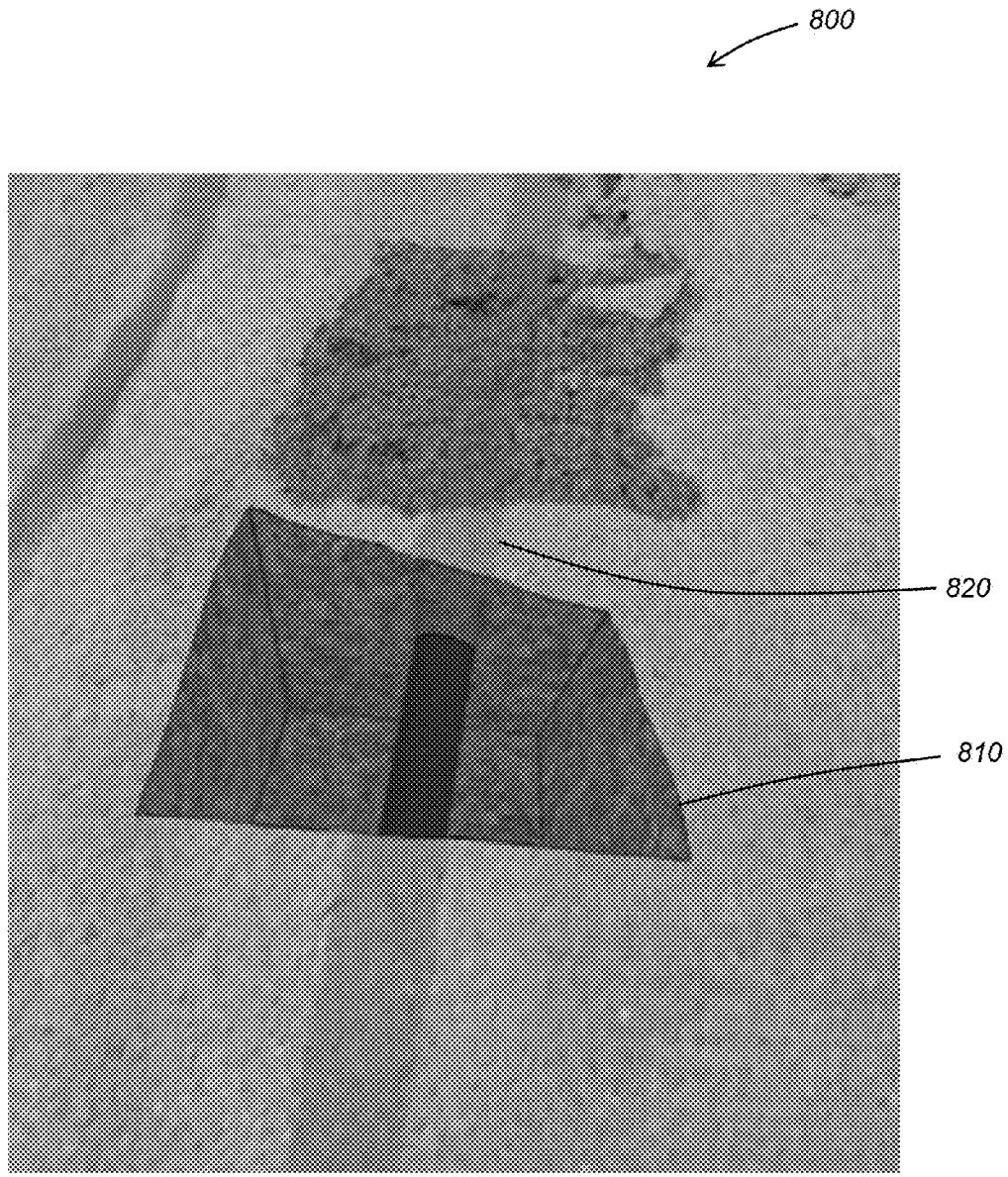
FIG. 8 is an example augmented view including both a virtual excavation and virtual paint markings that may be created as part of the sequence of steps of FIG. 4.

FIG. 8 is an example augmented view 800 including both a virtual excavation 810 and virtual paint markings 820 that may be created as part of FIG. 4. A combination of the operations described above may be used to produce the combined view.

Figure 9:
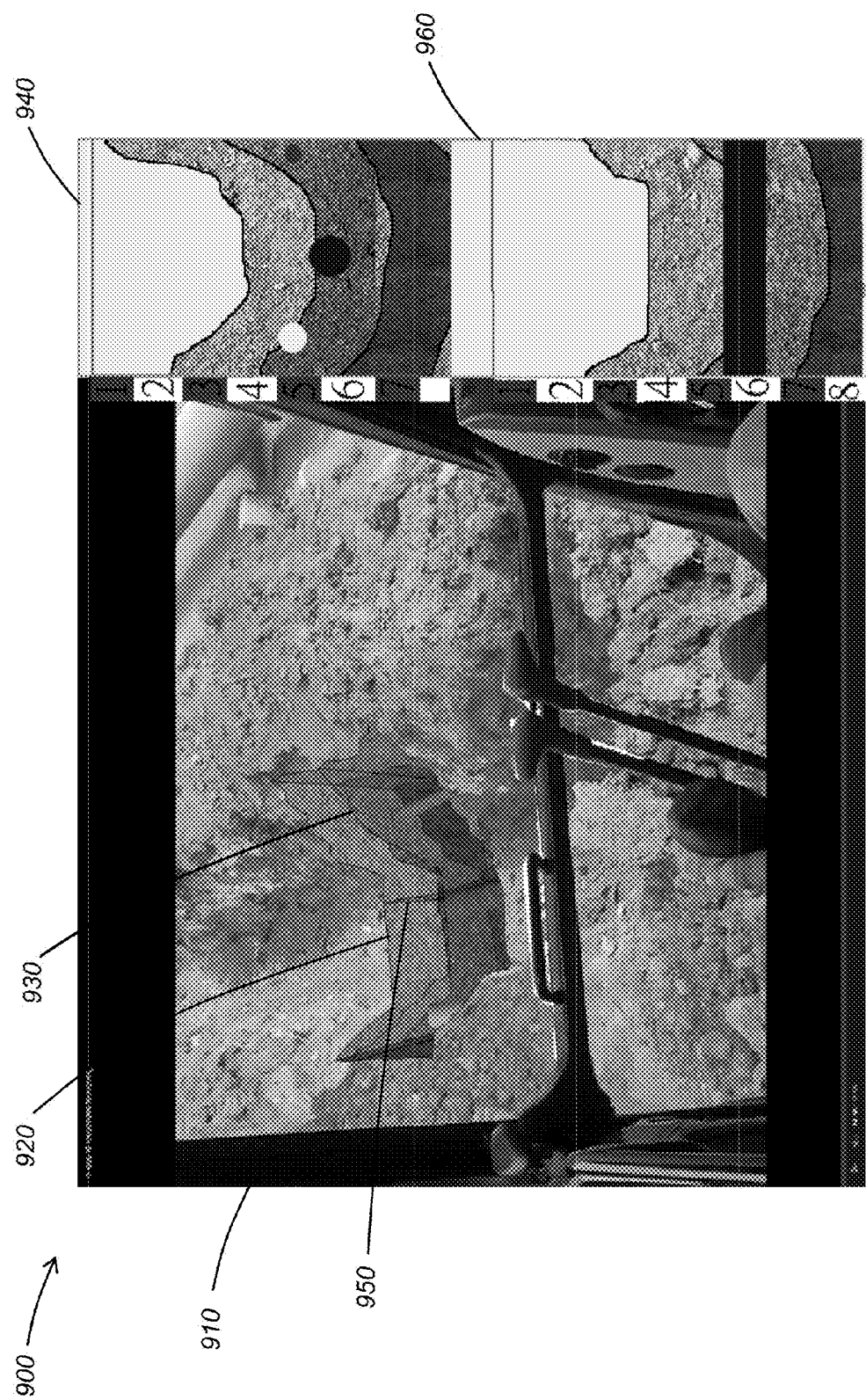
FIG. 9 is an example hybrid display for use with a site having a dynamically changing terrain surface.

Further, the virtual excavation and/or virtual paint markings may be included as part of a larger hybrid display. FIG. 9 is an example hybrid display 900 for use with a site having a dynamically changing terrain surface. The hybrid display 900 includes a first view 910 that shows the terrain augmented with a virtual excavation 920, a second view 940 that shows a vertical section generated from a first slicing plane 930 disposed in the virtual excavation 920, and a third view 960 that shows a vertical section generated from a second slicing plane 950 disposed in the virtual excavation 920. The edges of the slicing planes 930, 950 may be conformed to the terrain surface based on the live georeferenced terrain surface topography. The views generated from the slicing planes 930, 950 may be generated based upon the georeferenced 3-D model 342. A user may be allowed to move the slicing planes 930, 950 (e.g., translate the planes along an axis) using the user interface of the augmented reality application 340. In response thereto, the views 940, 960 generated from the slicing planes may be automatically updated.

While the above description discusses example techniques for providing augmented reality for a site having a dynamically changing terrain surface, it should be understood that a number of modifications and/or additions may be made without departing from the disclosure's intended spirit and scope.

For example, while it is discussed above that the techniques may be used with an excavator 210, it should be understood that the techniques may also be utilized with a variety of other pieces of heavy construction equipment capable digging or moving earth, including backhoes, loaders, bulldozers, etc. Further, it should be understood that the techniques may be used absent heavy construction equipment, and the changes to the terrain are caused by manual operations, natural forces, or other stimuli.

Further, while it is discussed above that a display device 270 may be disposed within the cab of an excavator 210 to show the augmented view to the operator, it should be understood that the augmented view may be shown elsewhere instead of, or in addition to, in the cab of an excavator or other piece of heavy construction equipment. For instance, the augmented view may be shown on a mobile device (e.g., a tablet computer, smartphone, etc.) of a worker who is disposed nearby the excavation. The mobile device may display the excavation site from its own perspective (e.g., based on its own camera). In such case, the tracking system 260 may be used to determine the pose of the mobile device, for use in generating the augmented view displayed thereon.

Further, while it is discussed above that a texture may be applied to the boundaries of a virtual excavation to make them more visible, it should be understood that the textures may also be used to convey additional information about subsurface features. For example, the textures may be based upon ground penetrating radar (GPR) data for the site. The GPR data may be georeferenced to correspond with the georeferenced 3-D model 342. GPR data whose position intersects the boundary surfaces of the virtual excavation may be rendered as 2-D images, and projected onto those boundary surfaces.

In general, it should be understood that the above discussed techniques may be implemented in software, in hardware, or in a combination thereof. A software implementation may include electronic device-executable instructions stored in a non-transitory electronic device-readable medium, such as a volatile or persistent memory, a harddisk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method for providing augmented reality for a site having a dynamically changing terrain surface comprising:
   capturing a live georeferenced terrain surface topography for the site using a sensor;
   capturing an image of the site using a camera;
   determining a georeferenced camera pose of the camera using a tracking system;
   aligning a georeferenced three-dimensional (3-D) model for the site with the live georeferenced terrain surface topography; and
   using at least the captured image, the georeferenced camera pose, the georeferenced 3-D model and the live georeferenced terrain surface topography, to create an augmented view of the site that shows graphical representations of subsurface features, wherein a least a portion of the graphical representations are dynamically conformed to the contours of the terrain surface based on the live georeferenced terrain surface topography.

2. The method of claim 1, wherein the graphical representation comprises a virtual excavation that surrounds a textured 3-D element representing a subsurface feature imposed upon the captured image, wherein the virtual excavation includes one or more boundary surfaces that are conformed to contours of the terrain surface based on the live georeferenced terrain surface topography.

3. The method of claim 1, wherein the graphical representation comprises virtual paint markings including a texture imposed at locations on the terrain surface in the captured image, wherein the locations are dynamically conformed to contours of the terrain surface based on the live georeferenced terrain surface topography.

4. The method of claim 1, wherein the graphical representations comprise both a virtual excavation and virtual paint markings.

5. The method of claim 1, wherein the augmented view is displayed as part of a hybrid display that includes at least one vertical section corresponding to a slicing plane.

6. The method of claim 1, wherein the site is a site of an ongoing excavation, and the capturing the live georeferenced terrain surface topography captures a change to the terrain surface that results from the ongoing excavation.

7. The method of claim 1, wherein the displaying further comprises:
   showing the augmented view within the cab of a piece of heavy construction equipment.

8. The method of claim 7, wherein the showing further comprises:
   projecting the augmented view onto a windshield of the piece of heavy construction equipment to provide a heads up display (HUD) to an operator.

9. The method of claim 7, wherein the piece of heavy construction equipment is an excavator.

10. The method of claim 1, wherein the live georeferenced terrain surface topography is a point cloud, and the method further comprises:
    converting the point cloud to a polygon mesh,
    wherein the aligning aligns the georeferenced 3-D model with the polygon mesh, and the using conforms at least a portion of the graphical representations to contours of the terrain surface based on the polygon mesh.

11. The method of claim 1, wherein the sensor includes a depth-sensing camera or laser scanning system, and the tracking system includes at least one global positioning system (GPS) receiver and orientation sensor, or at least one robotic total station theodolite (TST) station.

12. An apparatus comprising:
    a sensor configured to capture a live terrain surface topography for a site;
    a camera configured to capture an image of the site, the camera having a pose; and
    a computing device configured to execute an augmented reality application that is operable to:
       align a three-dimensional (3-D) model for the site with the live terrain surface topography, and
       use at least the captured image, the camera pose, the 3-D model and the live terrain surface topography, to create an augmented view of the site that shows graphical representations of subsurface features, wherein at least a portion of the graphical representations are dynamically conformed to the contours of the terrain surface based on the live terrain surface topography.

13. The apparatus of claim 12, further comprising a tracking system configured to determine the pose of the camera.

14. The apparatus of claim 12, wherein the graphical representations comprise a virtual excavation that surrounds a textured 3-D element representing a subsurface feature imposed upon the captured image, wherein the virtual excavation includes one or more boundary surfaces that are conformed to contours of the terrain surface based on the live terrain surface topography.

15. The apparatus of claim 12, wherein the graphical representations comprise virtual paint markings including a texture imposed at locations on the terrain surface in the captured image, wherein the locations are dynamically conformed to contours of the terrain surface based on the live terrain surface topography.

16. The apparatus of claim 12, wherein the graphical representations comprise both a virtual excavation and virtual paint markings.

17. A non-transitory electronic device-readable medium that includes instructions executable on the electronic-device that, when executed, are operable to:
    receive a captured image of a site and a terrain surface topography for the site;
    align a three-dimensional (3-D) model for the site with the terrain surface topography;
    create an augmented view of the site that shows graphical representations of subsurface features, wherein a least a portion of the graphical representations are dynamically conformed to the contours of the terrain surface based on the terrain surface topography, wherein the graphical representations include at least one of a virtual excavation that surrounds a textured 3-D element representing a subsurface feature, wherein the virtual excavation includes one or more boundary surfaces that are conformed to contours of the terrain surface based on the terrain surface topography, or virtual paint markings including a texture imposed at locations on the terrain surface in the captured image, wherein the locations are dynamically conformed to contours of the terrain surface based on the terrain surface topography.

18. The non-transitory electronic device-readable medium of claim 17, wherein the graphical representations comprise both the virtual excavation and the virtual paint markings.

19. The non-transitory electronic device-readable medium of claim 17, wherein the site is a site of an ongoing excavation, and the capturing the georeferenced terrain surface topography captures changes to the terrain surface that result from the ongoing excavation.

20. The non-transitory electronic device-readable medium of claim 17, wherein the instructions when executed are further operable to display the augmented view as a heads up display (HUD) onto a windshield of a piece of heavy construction equipment.

* * * * *